US012633953B2

(12) United States Patent
Cai

(10) Patent No.: US 12,633,953 B2
(45) Date of Patent: May 19, 2026

(54) ADJUSTABLE ELECTRONIC DEVICE SUPPORT

(71) Applicant: SHENZHEN DEONE INNOVATION TECHNOLOGY CO.,LTD, Shenzhen (CN)

(72) Inventor: Jiongjun Cai, Shenzhen (CN)

(73) Assignee: SHENZHEN DEONE INNOVATION TECHNOLOGY CO., LTD, Shenzhen (CN)

( * ) Notice: Subject to any disclaimer, the term of this patent is extended or adjusted under 35 U.S.C. 154(b) by 407 days.

(21) Appl. No.: 18/464,275

(22) Filed: Sep. 11, 2023

(65) Prior Publication Data

US 2024/0405791 A1 Dec. 5, 2024

(30) Foreign Application Priority Data

Jun. 1, 2023 (CN) .......................... 202321376575.4

(51) Int. Cl.
*H04B 1/3877* (2015.01)

(52) U.S. Cl.
CPC .................................. *H04B 1/3877* (2013.01)

(58) Field of Classification Search
CPC .......... H04M 1/04; H04M 1/12; H04M 1/022; H04M 1/06; H04M 1/026; H04M 1/6075; H04B 1/3877; H04B 1/3822; H04B 2001/3855
See application file for complete search history.

(56) References Cited

U.S. PATENT DOCUMENTS 8,662,362 B1 * 3/2014 Bastian .................. H04B 1/385
248/205.2
2020/0191178 A1 * 6/2020 Yang ......................... F16B 2/12

OTHER PUBLICATIONS (CN 114017638 A), Zhang et al., Multifunctional Electronic Device Bracket, Feb. 2022, pp. 1-12 (Year: 2022).*
(TW 200813361 A), Lu et al., Stand Structure for Electric Device, Mar. 2008, pp. 1-4 (Year: 2008).*

* cited by examiner

*Primary Examiner* — Keith Ferguson

(57) ABSTRACT

An adjustable electronic device support relates to a technical field of electronic device supports and includes rotating structures to switch between a folded state and an unfolded state. An electronic device holding portion is rotatably disposed on a supporting plate. A clamping portion is disposed on a fixing plate. The clamping portion assembles the adjustable electronic device support on a clamped object. The electronic device holding portion fixedly clamps the electronic device. When the adjustable electronic device support is in the folded state, the fixing plate and the supporting plate are folded and stored. At this time, the electronic device is still clamped by the electronic device holding portion. Then, the supporting plate are partially unfolded, and an unfolded space defined by the supporting plate provides space for the clamping portion to stretch, so that the clamping portion clamps the clamped object.

15 Claims, 5 Drawing Sheets

ADJUSTABLE ELECTRONIC DEVICE SUPPORT

TECHNICAL FIELD

The present disclosure relates to a technical field of electronic device supports, and in particular to an adjustable electronic device support.

BACKGROUND

In a long-distance travel process, no matter by plane, high-speed rail, or bus, it takes as little as a few hours, or as long as dozens of hours, so that people not only feel tired, but also feel boring. People can watch films and handle some commercial affairs through an electronic device to kill time. However, using the electronic device for a long time causes damage to a certain extent to cervical vertebra, thus causing the cervical vertebra ache in the travel process. If holding the electronic device in hand to maintain a level view state, it causes arm ache, thus affecting travel comfort.

There is an electronic device support on the market, which includes a clamping portion, an electronic device holding portion, and rotating structures. The clamping portion is configured to fix the electronic device support on a clamped object. The electronic device holding portion is configured to fix the electronic device. The rotating structures are disposed between the clamping portion and the electronic device holding portion, so that the electronic device support is able to be unfolded or folded, which is convenient to carry. The number of the rotating structures of the electronic device support is few, which cannot realize multi-angle adjustment of the electronic device support to adapt to various use scenes. But if the number of the rotating structures is too large, the electronic device support needs to be completely unfolded for fixing the electronic device, so that the electronic device support cannot be simply and quickly used.

SUMMARY

In order to solve defects in prior art, the present disclosure provides an adjustable electronic device support. The adjustable electronic device support includes rotating structures to adapt to various use scenes. In addition, an electronic device holding portion is disposed on the adjustable electronic device support and is configured to clamp an electronic device when the adjustable electronic device support is unfolded or folded, so that the adjustable electronic device support is used without completely unfolding the whole adjustable electronic device support, which is high in convenience.

In order to achieve above purpose, the present disclosure provides the adjustable electronic device support, including rotating structures, a fixing plate, and a supporting plate. The rotating structures are configured to switch the electronic device support between a folded state and an unfolded state. An end portion of the fixing plate and an end portion of the supporting plate are combined to form a first rotating shaft. The fixing plate includes two parts. A second rotating shaft extends from a first part of the fixing plate close to the first rotating shaft to a second part of the fixing plate. The second rotating shaft is configured to rotatably connect the two parts of the fixing plate. A rotating center line of the first rotating shaft is perpendicular to a rotating center line of the second rotating shaft. An electronic device holding portion is disposed on the supporting plate. A first surface of the electronic device holding portion is disposed outwards relative to the supporting plate and is configured to fixedly clamp an electronic device when the electronic device support is in the unfolded state or the folded state. A second surface of the electronic device holding portion is disposed towards an inner side of the supporting plate so as to attach to the supporting plate. A third rotating shaft is disposed between the electronic device holding portion and the supporting plate. A clamping portion is disposed on the fixing plate. The clamping portion is configured to assemble the adjustable electronic device support on a clamped object.

Optionally, the rotating center line of the first rotating shaft, the rotating center line of the second rotating shaft, a rotating center line of the third rotating shaft are perpendicular to each other.

Optionally, a baffle is disposed on the fixing plate, and the baffle is configured to limit a rotating range of the first rotating shaft.

Optionally, the clamping portion includes a connecting plate. The connecting plate is disposed on the fixing plate and is away from the first rotating shaft. A limiting plate is disposed on the connecting plate. The limiting plate is perpendicular to the connecting plate. A clamping plate, corresponding to the limiting plate, is slidably disposed on the clamping portion. A clamping space is defined between the clamping plate and the limiting plate. The clamping space is adjustable and is configured to clamp the clamped object. A reset component is disposed on the fixing plate. The reset component is connected to the clamping plate. The reset component is configured to push the clamping plate toward the limiting plate when the clamping plate moves away from the limiting plate.

Optionally, a wrench plate is disposed on the clamping plate. The wrench plate is pulled to drive the clamping plate to move away from the limiting plate.

Optionally, the wrench plate is an L-shaped plate. One end of the wrench plate is fixedly connected to the clamping plate.

Optionally, two clamping blocks with adjustable intervals are disposed at a top of the electronic device holding portion. The two clamping blocks are configured to clamp the electronic device. A spring component is disposed at a bottom of one of the two clamping blocks. The spring component is configured to limit positions of the two clamping blocks under an action of resilience force of the spring component.

Optionally, the third rotating shaft is disposed at a bottom of the electronic device holding portion. A rotating shaft base is disposed on the supporting plate. The third rotating shaft is rotatably matched with the rotating shaft base.

Optionally, the first rotating shaft is a damping shaft.

Optionally, the second rotating shaft is a rotating rod. A damping sleeve is disposed on the fixing plate. The rotating rod is rotatably assembled with the damping sleeve.

In the present disclosure, the adjustable electronic device support includes: the fixing plate and the supporting plate. The end portion of the fixing plate and the end portion of the supporting plate are combined to form the first rotating shaft. The fixing plate includes two parts. The second rotating shaft is disposed and extends from the first part of the fixing plate close to the first rotating shaft to the second part of the fixing plate. The second rotating shaft is configured to rotatably connect the two parts of the fixing plate. The rotating center line of the first rotating shaft is perpendicular to the rotating center line of the second rotating shaft. The electronic device holding portion is disposed on the supporting plate. The third rotating shaft is disposed between the electronic device holding portion and the supporting plate. Therefore, the adjustable electronic device support includes three rotating structures to enable the adjustable electronic device support to be adjusted from multiple angles to adapt to various use scenes.

The electronic device holding portion is disposed on the supporting plate. The clamping portion is disposed on the fixing plate. The clamping portion is configured to assemble the adjustable electronic device support on the clamped object. The electronic device holding portion is configured to fixedly clamp the electronic device when the adjustable electronic device support is in the unfolded or folded state. When the adjustable electronic device support is in the folded state, the fixing plate and the supporting plate are folded and stored. At this time, the electronic device is still fixedly clamped by the electronic device holding portion. Then, the supporting plate is partially unfolded so the adjustable electronic device support is partially unfolded, and an unfolded space defined by the support plate provides space for the clamping portion to stretch, so that the clamping portion clamps the clamped object, which achieves portable use of the present disclosure.

BRIEF DESCRIPTION OF DRAWINGS

In order to clearly illustrate embodiments of the present disclosure or technical solutions in the prior art, accompanying drawings required to be used in the embodiments or the prior art are briefly described below. Obviously, the drawings in following description are merely some embodiments of the present disclosure. For a person of ordinary skill in the art, other drawings are obtained according to the drawings without involving any inventive effort.

Figure 1:
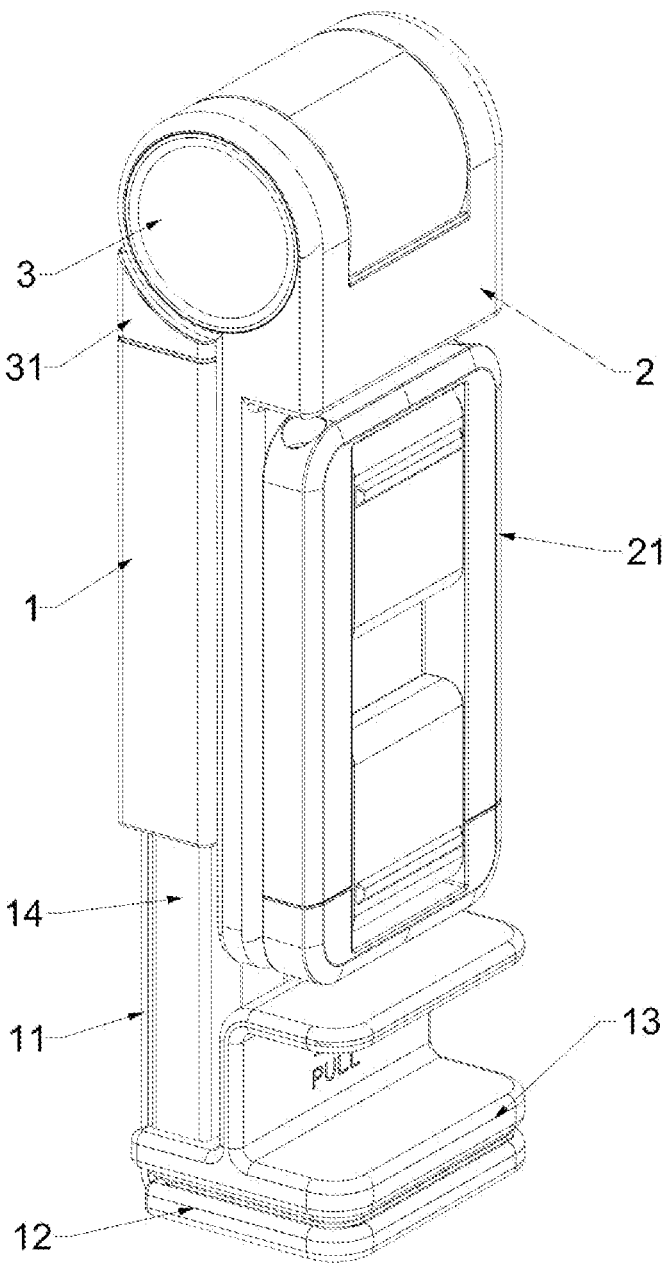
FIG. 1 is a structural schematic diagram of an adjustable electronic device support according to one embodiment of the present disclosure.

Reference number in the drawings: 1. fixing plate; 11. connecting plate; 12. limiting plate; 13. clamping portion; 131. clamping plate; 132. spring guide groove; 133. wrench plate; 14. reset component; 15. damping sleeve; 2. supporting plate; 21. electronic device holding portion; 211. third rotating shaft; 212. clamping blocks; 213. spring component; 22. rotating shaft base; 3. first rotating shaft; 31. baffle; 32. second rotating shaft.

DETAILED DESCRIPTION

The present disclosure is described in details below with reference to accompanying drawings.

Specific embodiments are merely explanations of the present disclosure, and are not limitations on the present disclosure. After reading specification, a person skilled in art makes modifications which do not create contributions to the embodiments according to needs, but are protected by patent law only within a scope of claims of the present disclosure.

Figure 2:
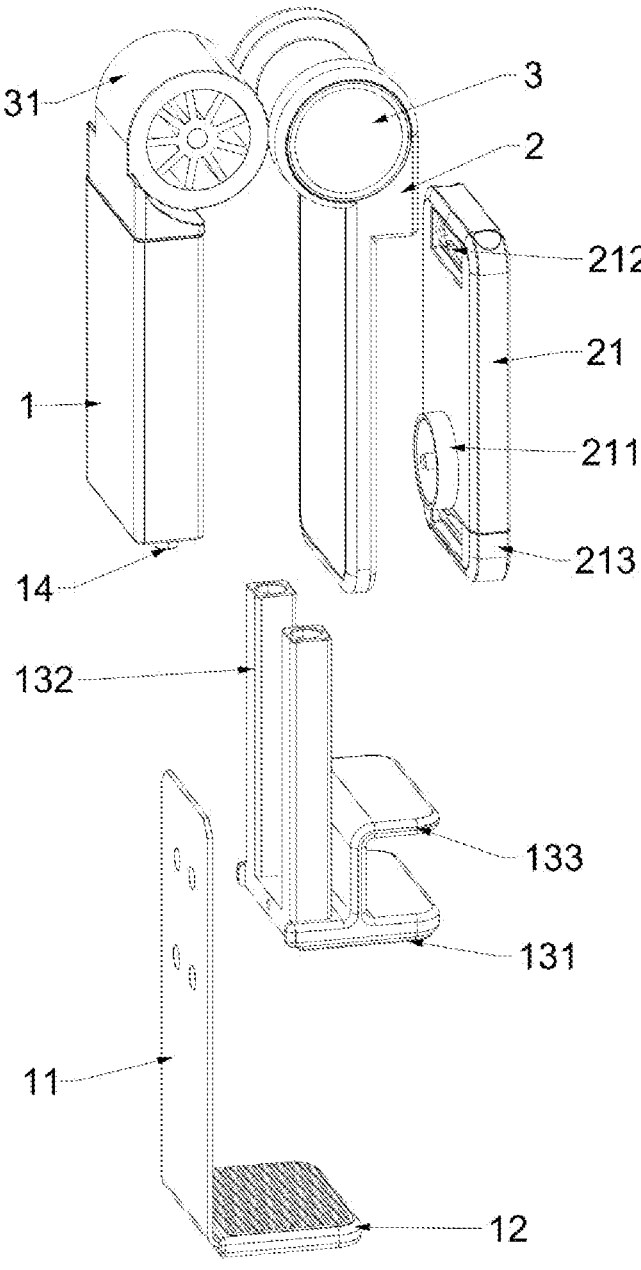
FIG. 2 is an exploded schematic diagram of the adjustable electronic device support shown in FIG. 1.

The present disclosure provides an adjustable electronic device support, as shown in FIGS. 1-2. The adjustable electronic device support includes a fixing plate 1 and a supporting plate 2. An end portion of the fixing plate 1 and an end portion of the supporting plate 2 are combined to form a first rotating shaft 3. The first rotating shaft 3 enables the supporting plate 2 to rotate relative to the fixing plate 1, and when the fixing plate 1 and the supporting plate 2 are folded or unfolded, the fixing plate 1 and the supporting plate 2 are folded or unfolded through rotation of the first rotating shaft 3. The fixing plate 1 includes two parts. A first part of the fixing plate 1 is disposed close to the first rotating shaft 3. A second rotating shaft 32 is disposed and extends from the first part of the fixing plate 1 to a second part of the fixing plate 1. The second rotating shaft 32 is configured to rotatably connect the two parts of the fixing plate 1. The second rotating shaft 32 enables the supporting plate 2 to rotate in a vertical direction relative to the fixing plate 1 after the fixing plate 1 and the supporting plate 2 are unfolded. Therefore, a rotating center line of the first rotating shaft 3 is perpendicular to a rotating center line of the second rotating shaft 32. In the embodiment, an electronic device includes but is not limited to a mobile phone, a computer, a flat plate, and an electronic game machine.

Optionally, an electronic device holding portion 21 is disposed on the supporting plate 2. A first surface of the electronic device holding portion 21 is disposed outwards relative to the supporting plate 2. The electronic device holding portion 21 is configured to clamp the electronic device. A second surface of the electronic device holding portion 21 is disposed towards an inner side of the supporting plate 2 and is attached to the supporting plate 2. A third rotating shaft 211 is disposed between the electronic device holding portion 21 and the supporting plate 2. A clamping portion 13 is disposed on the fixing plate 1. The clamping portion 13 is configured to detachably assemble the adjustable electronic device support on a clamped object, so that the whole adjustable electronic device support is assembled. In the embodiment, the rotating center line of the first rotating shaft 3, the rotating center line of the second rotating shaft 32, a rotating center line of the third rotating shaft 211 are perpendicular to each other That is, the three rotating center lines of the three rotating shafts are disposed in a three-axis coordinate system shape after being extended and intersected, and the whole adjustable electronic device support is flexibly adapted to various use scenes through rotation of the three rotating shafts.

It should be noted that the electronic device holding portion 21 is configured to fixedly clamp the electronic device when the adjustable electronic device support is in the unfolded or folded state. When the adjustable electronic device support is in the folded state, the fixing plate 1 and the supporting plate 2 are folded and stored. At this time, the electronic device is still clamped by the electronic device holding portion 21. Then, the adjustable electronic device support is clamped on the clamped object through the clamping portion 13. Then, the supporting plate 2 and the fixing plate 1 may be partially unfolded to use the adjustable electronic device support, unfolded parts of the supporting plate 2 and the fixing plate 1 provide space for the clamping portion to stretch, so that the clamped object is clamped by the clamping portion, which improves convenience of use.

In the embodiment, a baffle 31 is disposed on the fixing plate 1. The baffle 31 is configured to limit a rotating range of the first rotating shaft 3. The baffle 31 is disposed in an arc shape and is attached to a part, close to the second rotating shaft 32, of the first rotating shaft 3, so that when the supporting plate 2 is gradually unfolded and rotated through the first rotating shaft 3, the baffle 31 blocks the supporting plate 2 from continuously rotating, and therefore a rotating angle of the supporting plate 2 relative to the fixing plate 1 is limited within a certain range. Optionally, the rotating range is 0-240 degrees, and the rotating range may also be other ranges, such as 0-180 degrees or 0-200 degrees.

Figure 4:
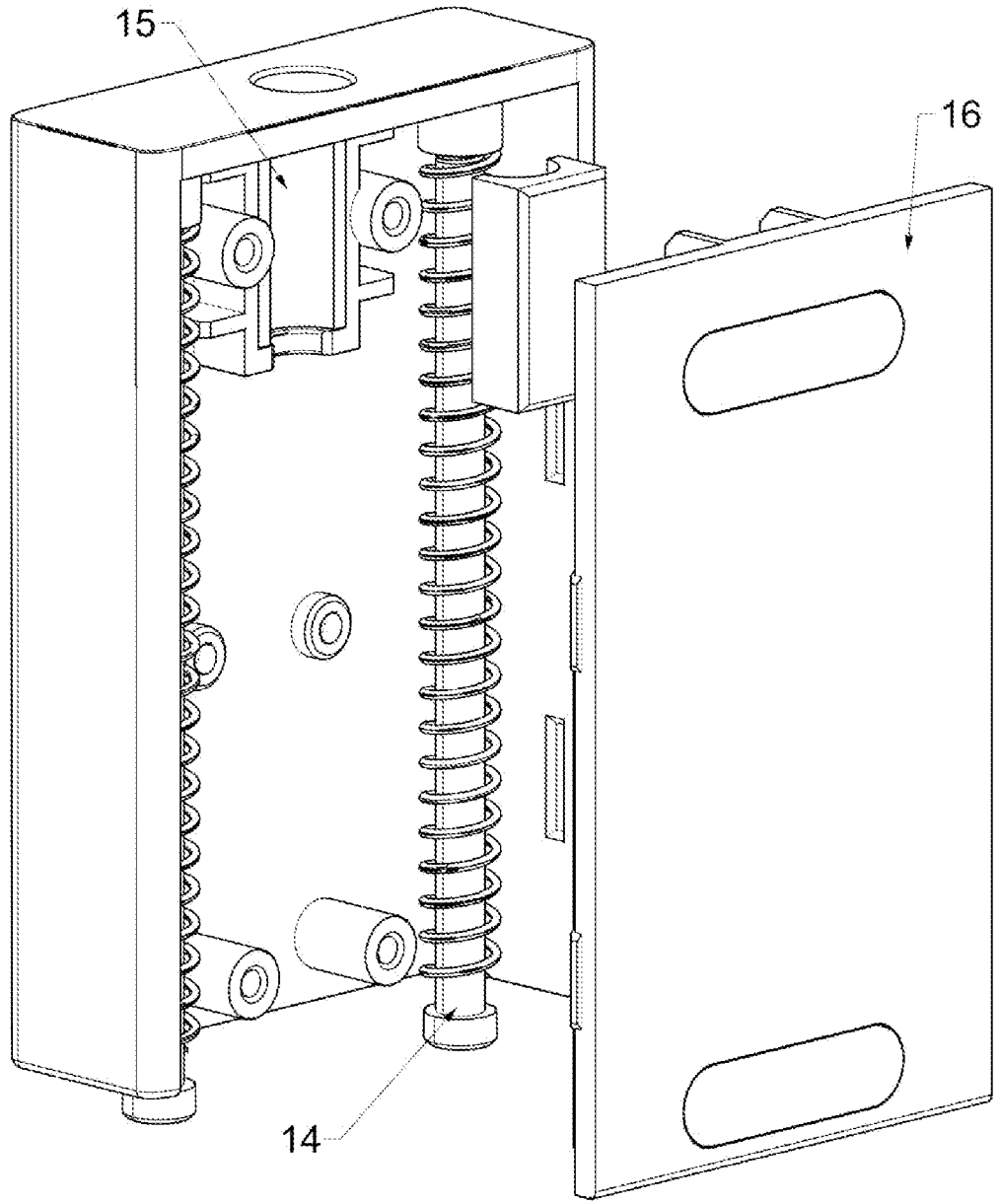
FIG. 4 is a structural schematic diagram of a second part of the adjustable electronic device support according to one embodiment of the present disclosure.

As shown in FIG. 2 and FIG. 4, the clamping portion 13 includes a connecting plate 11. The connecting plate 11 is disposed on the fixing plate 1 and is away from the first rotating shaft 3. A limiting plate 12 is disposed on the connecting plate 11. The limiting plate 12 is perpendicular to the connecting plate 11. The connecting plate 11 and the limiting plate 12 are fixedly assembled. The connecting plate 11 and the limiting plate 12 are disposed in an L-shaped sheet shape after being assembled. One end of the connecting plate 11 is connected to the fixing plate 1. A clamping plate 131, corresponding to the limiting plate 12, is slidably disposed on the clamping portion 13. A clamping space is defined between the clamping plate 131 and the limiting plate 12. The clamping space is adjustable and is configured to clamp the clamped object. A distance between the clamping plate and the limiting plate 12 is adjusted by sliding the clamping plate 131, so that a size of the clamping space is adjusted to adapt to clamped objects of various different shapes and sizes. In the embodiment, protective pads are disposed on the clamping plate 131 and the limiting plate 12. Specifically, the protective pads are respectively disposed on a surface, facing the limiting plate 12, of the clamping plate 131, and a surface, facing the clamping plate 131, of the limiting plate 12, which are configured to improve clamping friction force on the clamped objects.

In addition, a reset component 14 is disposed on the fixing plate 1. The reset component 14 is connected to the clamping plate 131. The reset component 14 is configured to push the clamping plate 131 toward the limiting plate 12 when the clamping plate 131 moves away from the limiting plate 12. When the user pulls the clamping plate 131 to increase the size of the clamping space, the clamped object is placed into the clamping space. Then, the user loosens a hand pulling the clamping plate 131. At this time, the reset component 14 pushes the clamping plate 131 towards the limiting plate 12, so that the clamping plate 131 cooperates with the limiting plate 12 to clamp the clamped object, thus fixing a bottom of the adjustable electronic device support. Specifically, when the supporting plate 2 is partially unfolded relative to the fixing plate 1, the limiting plate slides towards a direction of the reset component. An unfolded angle, which is an included angle between the supporting plate 2 and the fixing plate 1, is not less than 15 degrees, so that the limiting plate is allowed to slide towards the reset component. In other embodiments, the unfolded included angle is 10 degrees or 20 degrees.

In the embodiment, a first part of the reset component 14 is spring guide grooves 132 fixedly disposed on the clamping plate 131, and a second part of the reset component 14 is a spring group having first ends connected to the fixing plate 1. Second ends of the spring group are respectively connected to the spring guide grooves 132. When the clamping plate 131 is pulled to slide along a direction of the fixing plate 1, the spring group is compressed in the spring guide grooves 132, thereby generating a thrust force of the clamping plate 131 towards the limiting plate 12, so that the limiting plate 12 cooperates with the clamping plate 131 to effectively clamp the clamped object.

Figure 3:
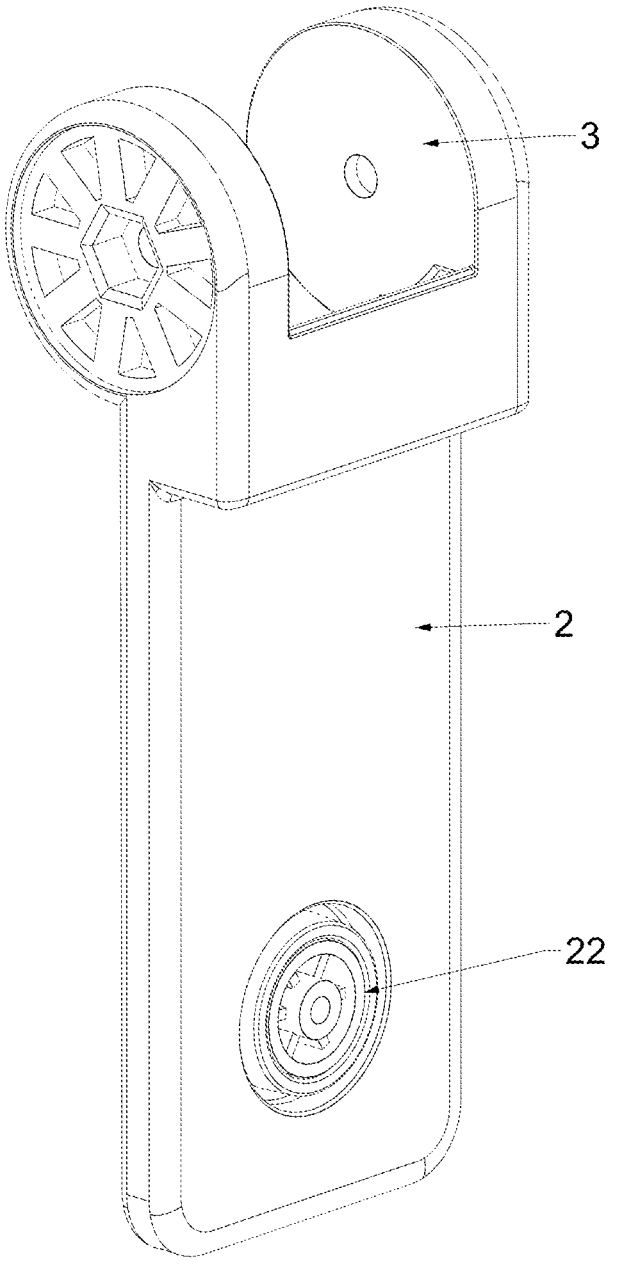
FIG. 3 is a structural schematic diagram of a first part of the adjustable electronic device support according to one embodiment of the present disclosure.

As shown in FIG. 3, a wrench plate 133 is disposed on the clamping plate 131. The wrench plate 133 is pulled by the user to drive the clamping plate to move away from the limiting plate. The wrench plate 133 is an L-shaped plate.

One end of the wrench plate 133 is fixedly connected to the clamping plate 131. The wrench plate 133 facilitates the user to manually pull the clamping plate 131.

Optionally, two clamping blocks 212 with adjustable intervals are disposed at a top of the electronic device holding portion 21. The two clamping blocks 212 are configured to clamp the electronic device. One end of each of the two clamping blocks 212 is hinged to the electronic device holding portion 21. The two clamping blocks 212 are unfolded during use, and the electronic device is placed between the two unfolded clamping blocks 212 so as to clamp and fix the electronic device.

In the embodiment, a spring component 213 is disposed at a bottom of one of the two clamping blocks 212. The spring component 213 is configured to limit positions of the two clamping blocks 212 under an action of resilience force of the spring component 213. When the user pulls the one of the two clamping blocks 212 to increase a distance between the two clamping blocks 212, the spring component 213 is compressed. Then the electronic device is placed between the two clamping blocks 212. At this time, the spring component 213 clamps the electronic device through the clamping blocks 212 under the action of the resilience force of the spring component 213. The spring component 213 is a spring group including at least two springs.

In other embodiments, the electronic device holding portion 21 is a magnetic portion, and the electronic device is magnetically fixed by disposing a plurality of magnets on the electronic device holding portion 21.

It needs to be supplemented that the third rotating shaft 211 is disposed at a bottom of the electronic device holding portion 21, that is, the third rotating shaft 211 is disposed at a surface of the electronic device holding portion 21 attached to the supporting plate 2. A rotating shaft base 22 is disposed on the supporting plate 2. The third rotating shaft 211 is rotatably matched with the rotating shaft base 22, which allows the electronic device holding portion 21 to rotate on the supporting plate 2, making it convenient for the user to adjust the angle of the adjustable electronic device support.

Figure 5:
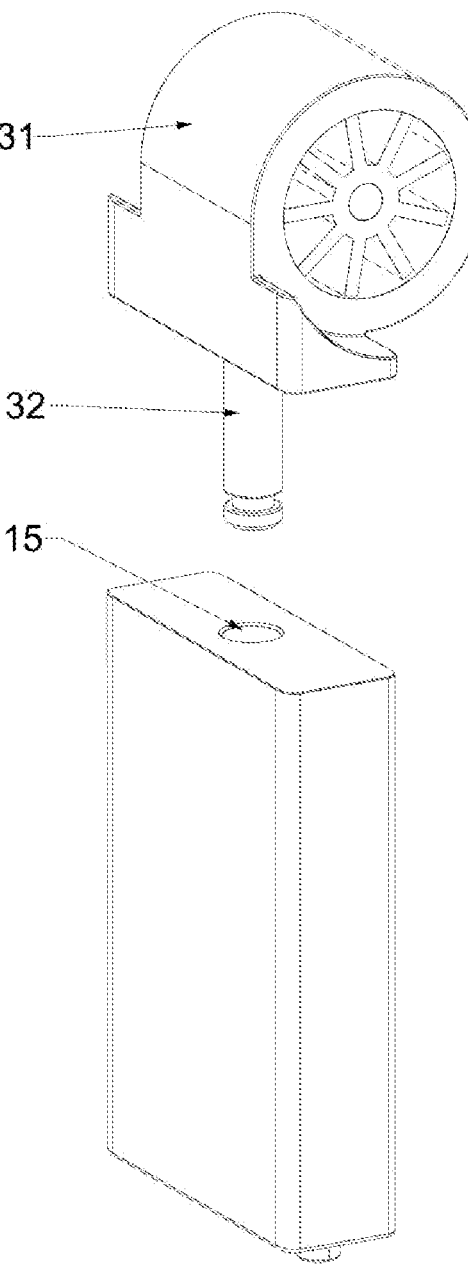
FIG. 5 is an exploded schematic diagram of partial structures shown in FIG. 2.

As shown in FIG. 5, the first rotating shaft 3 is a damping shaft. A first end of the damping shaft is fixedly connected to the supporting plate 2, and a second end of the damping shaft is connected to the second rotating shaft 32. The second rotating shaft 32 is a rotating rod. The second rotating shaft 32 is specifically disposed at a bottom of the baffle 31. A first part of two parts of the fixing plate 1 is the baffle 31, a second part of the two parts of the fixing plate 1 is a plate body. One side, away from the rotating rod, of the baffle 31 is rotatably connected to the damping shaft. A damping sleeve 15 is disposed in the plate body. The rotating rod is rotatably assembled with the damping sleeve. The damping sleeve 15 generates friction when the rotating rod rotates, so that the rotating rod does not slip after maintaining an angle required by rotation.

The above description is only configured to describe the technical solution of the present disclosure, and is not to limit the present disclosure. Any other modifications or equivalent replacements made by a person of ordinary skill in the art to the technical solution of the present disclosure, as long as do not deviate from spirit and scope of the technical solution of the present disclosure, shall be included in the scope of claims of the present disclosure.

What is claimed is:

1. An adjustable electronic device support, comprising:
rotating structures;
a fixing plate; and
a supporting plate;
wherein the rotating structures enables the electronic device support to switch between a folded state and an unfolded state; an end portion of the fixing plate and an end portion of the supporting plate are combined to form a first rotating shaft; the fixing plate comprises two parts; a second rotating shaft extends from a first part of the fixing plate close to the first rotating shaft to a second part of the fixing plate, the second rotating shaft is configured to rotatably connect the two parts of the fixing plate; and a rotating center line of the first rotating shaft is perpendicular to a rotating center line of the second rotating shaft;
an electronic device holding portion is disposed on the supporting plate, a first surface of the electronic device holding portion is disposed outwards relative to the supporting plate and is configured to fixedly clamp an electronic device when the adjustable electronic device support is in the unfolded state or the folded state, a second surface of the electronic device holding portion is disposed towards an inner side of the supporting plate so as to attach to the supporting plate, and a third rotating shaft is disposed between the electronic device holding portion and the supporting plate; and
a clamping portion is disposed on the fixing plate, and the clamping portion is configured to assemble the adjustable electronic device support on a clamped object;
wherein the clamping portion comprises a connecting plate, the connecting plate is disposed on the fixing plate and is away from the first rotating shaft, and a limiting plate is disposed on the connecting plate; the limiting plate is perpendicular to the connecting plate; and
a clamping plate, corresponding to the limiting plate, is slidably disposed on the clamping portion; a clamping space is defined between the clamping plate and the limiting plate, the clamping space is adjustable and is configured to clamp the clamped object.

2. The adjustable electronic device support according to claim 1, wherein the rotating center line of the first rotating shaft, the rotating center line of the second rotating shaft, and a rotating center line of the third rotating shaft are perpendicular to each other.

3. The adjustable electronic device support according to claim 1, wherein a baffle is disposed on the fixing plate, and the baffle is configured to limit a rotating range of the first rotating shaft.

4. The adjustable electronic device support according to claim 1, wherein
a reset component is disposed on the fixing plate, the reset component is connected to the clamping plate, and the reset component is configured to push the clamping plate toward the limiting plate when the clamping plate moves away from the limiting plate.

5. The adjustable electronic device support according to claim 4, wherein a wrench plate is disposed on the clamping plate, and the wrench plate is pulled to drive the clamping plate to move away from the limiting plate.

6. The adjustable electronic device support according to claim 5, wherein the wrench plate is an L-shaped plate, and one end of the wrench plate is fixedly connected to the clamping plate.

7. The adjustable electronic device support according to claim 1, wherein two clamping blocks with adjustable intervals are disposed at a top of the electronic device holding portion, the two clamping blocks are configured to clamp the electronic device, a spring component is disposed at a bottom of one of the two clamping blocks, and the spring component is configured to limit positions of the two clamping blocks under an action of resilience force of the spring component.

8. The adjustable electronic device support according to claim 7, wherein the third rotating shaft is disposed at a bottom of the electronic device holding portion, a rotating shaft base is disposed on the supporting plate, and the third rotating shaft is rotatably matched with the rotating shaft base.

9. The adjustable electronic device support according to claim 1, wherein the first rotating shaft is a damping shaft.

10. The adjustable electronic device support according to claim 1, wherein the second rotating shaft is a rotating rod, a damping sleeve is disposed on the fixing plate, and the rotating rod is rotatably assembled with the damping sleeve.

11. An adjustable electronic device support, comprising:
rotating structures;
a fixing plate; and
a supporting plate;
wherein the rotating structures enables the electronic device support to switch between a folded state and an unfolded state; an end portion of the fixing plate and an end portion of the supporting plate are combined to form a first rotating shaft; the fixing plate comprises two parts; a second rotating shaft extends from a first part of the fixing plate close to the first rotating shaft to a second part of the fixing plate, the second rotating shaft is configured to rotatably connect the two parts of the fixing plate; and a rotating center line of the first rotating shaft is perpendicular to a rotating center line of the second rotating shaft;
an electronic device holding portion is disposed on the supporting plate, a first surface of the electronic device holding portion is disposed outwards relative to the supporting plate and is configured to fixedly clamp an electronic device when the adjustable electronic device support is in the unfolded state or the folded state, a second surface of the electronic device holding portion is disposed towards an inner side of the supporting plate so as to attach to the supporting plate, and a third rotating shaft is disposed between the electronic device holding portion and the supporting plate; and
a clamping portion is disposed on the fixing plate, and the clamping portion is configured to assemble the adjustable electronic device support on a clamped object;
wherein the second rotating shaft is a rotating rod, a damping sleeve is disposed on the fixing plate, and the rotating rod is rotatably assembled with the damping sleeve.

12. The adjustable electronic device support according to claim 11, wherein the rotating center line of the first rotating shaft, the rotating center line of the second rotating shaft, and a rotating center line of the third rotating shaft are perpendicular to each other.

13. The adjustable electronic device support according to claim 11, wherein a baffle is disposed on the fixing plate, and the baffle is configured to limit a rotating range of the first rotating shaft.

14. The adjustable electronic device support according to claim 11, wherein two clamping blocks with adjustable intervals are disposed at a top of the electronic device holding portion, the two clamping blocks are configured to clamp the electronic device, a spring component is disposed at a bottom of one of the two clamping blocks, and the spring component is configured to limit positions of the two clamping blocks under an action of resilience force of the spring component.

15. The adjustable electronic device support according to claim 14, wherein the third rotating shaft is disposed at a bottom of the electronic device holding portion, a rotating shaft base is disposed on the supporting plate, and the third rotating shaft is rotatably matched with the rotating shaft base.

*     *     *     *     *